United States Patent
Wakabayashi

(10) Patent No.: US 10,606,127 B2
(45) Date of Patent: Mar. 31, 2020

(54) LIQUID CRYSTAL APPARATUS, ELECTRONIC APPARATUS, AND METHOD FOR DRIVING LIQUID CRYSTAL APPARATUS

(71) Applicant: SEIKO EPSON CORPORATION, Tokyo (JP)

(72) Inventor: Junichi Wakabayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/285,625

(22) Filed: Feb. 26, 2019

(65) Prior Publication Data
US 2019/0265534 A1    Aug. 29, 2019

(30) Foreign Application Priority Data
Feb. 27, 2018   (JP) .................................. 2018-032902

(51) Int. Cl.
*G02F 1/13363* (2006.01)
*G02F 1/1343* (2006.01)
*G02F 1/137* (2006.01)
*G02F 1/1337* (2006.01)

(52) U.S. Cl.
CPC .......... *G02F 1/13363* (2013.01); *G02F 1/137* (2013.01); *G02F 1/1337* (2013.01); *G02F 1/134309* (2013.01); *G02F 2001/13712* (2013.01); *G02F 2203/64* (2013.01)

(58) Field of Classification Search
CPC .................................................. G02F 1/1336
See application file for complete search history.

(56) References Cited

U.S. PATENT DOCUMENTS

| | | | |
|---|---|---|---|
| 7,671,946 B2 | 3/2010 | Tan et al. | |
| 2008/0100759 A1 | 5/2008 | Tateno | |
| 2009/0244455 A1 | 10/2009 | Horikoshi | |
| 2012/0307178 A1* | 12/2012 | Cheng | G02F 1/133524 349/62 |
| 2013/0128210 A1* | 5/2013 | Nagasawa | G02F 1/13452 349/151 |
| 2017/0343869 A1* | 11/2017 | Matsumura | G02F 1/134363 |

FOREIGN PATENT DOCUMENTS

| | | |
|---|---|---|
| JP | 2008-134596 A | 6/2008 |
| JP | 2009-025541 A | 2/2009 |
| JP | 2009-037025 A | 2/2009 |
| JP | 2009-229971 A | 10/2009 |
| JP | 2013-007953 A | 1/2013 |
| JP | 2013-174649 A | 9/2013 |
| JP | 2014-010211 A | 1/2014 |

* cited by examiner

*Primary Examiner* — Edmond C Lau
(74) *Attorney, Agent, or Firm* — Oliff PLC

(57) ABSTRACT

In a liquid crystal apparatus, a second substrate is provided with an optical compensation layer having inclined surfaces at a first substrate side. A liquid crystal layer includes liquid crystal molecules having negative dielectric anisotropy. While no voltage is applied to the liquid crystal layer, an angle between a long axis direction of the liquid crystal molecules and each of the inclined surfaces is set to an angle smaller than 90°.

8 Claims, 9 Drawing Sheets

Fig. 12A  $\theta a = 90°$
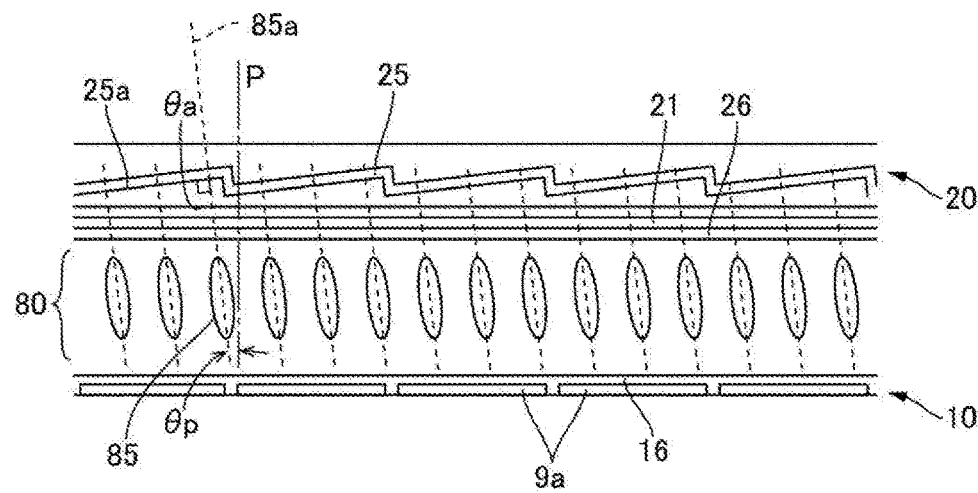
Fig. 12B  $\theta a > 90°$
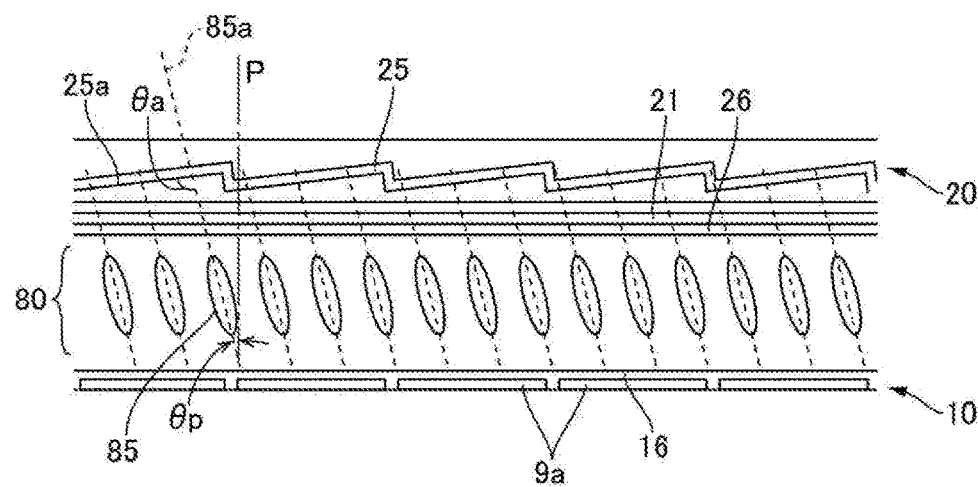

LIQUID CRYSTAL APPARATUS, ELECTRONIC APPARATUS, AND METHOD FOR DRIVING LIQUID CRYSTAL APPARATUS

BACKGROUND

1. Technical Field

The invention relates to a liquid crystal apparatus, an electronic apparatus, and a method for driving the liquid crystal apparatus. The liquid crystal apparatus includes an optical compensation element.

2. Related Art

A liquid crystal display apparatus is provided with a liquid crystal layer between a first substrate having a surface provided with a first electrode and a first oriented film and a second substrate provided with a second electrode and a second oriented film. To achieve high speed driving and high contrast capability, such a liquid crystal material has mainly been used that is a liquid crystal material (Vertical Alignment (VA)) type provided with a liquid crystal layer having negative dielectric anisotropy. In such a liquid crystal apparatus, liquid crystal molecules are generally pre-tilted by a first oriented film and a second oriented film to allow a long axis direction of the liquid crystal molecules to incline with respect to a normal line direction of a first substrate and a second substrate.

On the other hand, in a VA-type liquid crystal apparatus, due to a pre-tilt angle, as well as due to dielectric anisotropy and refractive index anisotropy of a liquid crystal material, light passed through a liquid crystal layer would become elliptically polarized light, causing the light to leak. As a result, contrast lowers. Such a technique has been adopted that provides an optical compensation plate in addition to a liquid crystal panel to cancel out retardation. However, to provide the optical compensation plate, the optical compensation plate is required to be adjusted for its angle while driving a liquid crystal apparatus and observing transmittance, leading to a greater effort for the adjustment.

Such a technique has been proposed that an optical compensation layer having inclined surfaces is provided on either of a first substrate and a second substrate as a negative C plate to incorporate an optical compensation element into a liquid crystal apparatus (see JP-A-2013-174649).

In the configuration described in JP-A-2013-174649, also as FIG. 12A illustrates an optimal state (a), the angle θa of the long axis direction 85a of the liquid crystal molecules 85 being pre-tilted in the liquid crystal layer 80 with respect to each of the inclined surfaces 25a of the optical compensation layer 25 is 90°.

However, in a case where an angle (the pre-tilt angle θp) between the long axis direction 85a of the liquid crystal molecules 85 and the normal line direction P to the first substrate 10 varies when producing a liquid crystal apparatus, the angle θa between the long axis direction 85a of the liquid crystal molecules 85 and each of the inclined surfaces 25a might become an angle other than 90°. For example, as illustrated in FIG. 12B, in a varied state (b) where θa>90°, the pre-tilt angle θp might exceed an angle when the long axis direction 85a of the liquid crystal molecules 85 forms an angle of 90° with respect to each of the inclined surfaces. In this case, retardation increases, lowering display quality.

SUMMARY

An advantage of some aspects of the invention is to provide a liquid crystal apparatus, an electronic apparatus, and a method for driving the liquid crystal apparatus. The liquid crystal apparatus is capable of suppressing a reduction in display quality due to variations in a pre-tilt angle of liquid crystal molecules in a configuration where an optical compensation layer is incorporated.

For the issue described above, a liquid crystal apparatus according to an aspect of the invention includes a first substrate provided, at one surface side thereof, with a first electrode and a first oriented film covering the first electrode, a second substrate provided, at one surface side thereof, with an optical compensation layer having inclined surfaces at the first substrate side, a second electrode provided at the first substrate side of the optical compensation layer, and a second oriented film covering the second electrode, and a liquid crystal layer including liquid crystal molecules having negative dielectric anisotropy and provided between the first substrate and the second substrate. In a state where no voltage is applied to the liquid crystal layer, an angle between a long axis direction of the liquid crystal molecules and the inclined surface is set to an angle smaller than 90°.

In the invention, the liquid crystal molecules in the liquid crystal layer are pre-tilted. Meanwhile, the second substrate is provided with the optical compensation layer having the inclined surfaces at the first electrode side of the first substrate. While the long axis direction of the liquid crystal molecules forms an angle of 90° with respect to each of the inclined surfaces, the optical compensation layer compensates elliptically polarized light components. Different from a case when a separate optical compensation plate is provided, an angle adjustment for the optical compensation plate, which requires a greater effort, is not therefore required. In the invention, the pre-tilt angle of the liquid crystal molecules is set smaller than an angle when the long axis direction of the liquid crystal molecules forms an angle of 90° with respect to each of the inclined surfaces. When each of the first electrodes and the second electrode are applied with no voltage, the optical compensation layer cannot fully compensate elliptically polarized light components. Even in this case, because the liquid crystal molecules have negative dielectric anisotropy, when a voltage is applied to each of the first electrodes and the second electrode, the long axis direction of the liquid crystal molecules can be inclined to form an angle of 90° with respect to each of the inclined surfaces. Elliptically polarized light components can therefore be compensated. Even in a configuration incorporated with an optical compensation layer, a reduction in display quality due to variations in the pre-tilt angle of the liquid crystal molecules and thus increases in retardation can therefore be suppressed.

For the liquid crystal apparatus and a method for driving the liquid crystal apparatus, according to the invention, such an aspect may be adopted that the liquid crystal layer is a normally black mode, and a minimum drive voltage corresponding to a minimum tone level is higher than 0 V, but lower than a threshold voltage at which, in a relative transmittance-voltage characteristic indicative of a relationship between a voltage to be applied to the liquid crystal layer and relative transmittance, the relative transmittance is 10%. According to the aspect, a state where a drive voltage higher than 0 V is applied between each of the first electrodes and the second electrode, the long axis direction of the liquid crystal molecules is allowed to form an angle of 90° with respect to each of the inclined surfaces, and elliptically polarized light components compensated can be set as a minimum tone level.

In the invention, such an aspect may be adopted that the relative transmittance when a voltage to be applied to the liquid crystal layer is 0 V is higher than the relative transmittance when a voltage to be applied to the liquid crystal layer is the minimum drive voltage.

In the invention, such an aspect may be adopted that the first oriented film and the second oriented film respectively include columnar structure bodies including columnar bodies inclined with respect to a normal line direction to the first substrate.

The liquid crystal apparatus according to the invention can be used for electronic apparatuses including cellular phones, mobile computers, and projection-type display apparatuses, for example. Among the electronic apparatuses, the projection-type display apparatuses each include a light source configured to supply light to a liquid crystal apparatus, and a projection optical system configured to project light optically modulated by the liquid crystal apparatus.

BRIEF DESCRIPTION OF THE DRAWINGS

The invention will be described with reference to the accompanying drawings, wherein like numbers reference like elements.

FIGS. 12A and 12B are explanatory views of the optical compensation layer.

DESCRIPTION OF EXEMPLARY EMBODIMENTS

Figure 1:
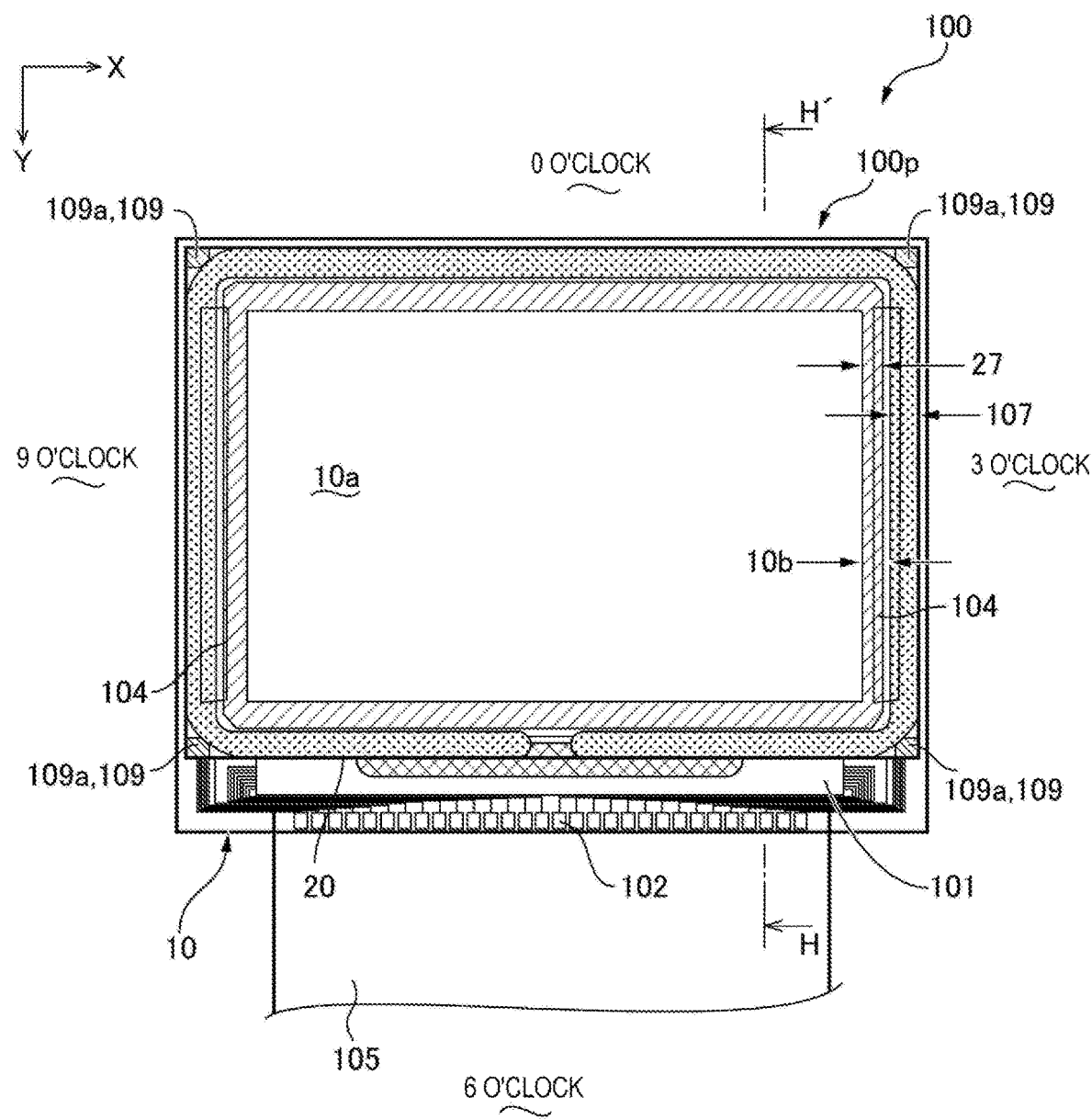
FIG. 1 is a plan view of a liquid crystal panel of a liquid crystal apparatus to which the invention is applied.
Figure 2:
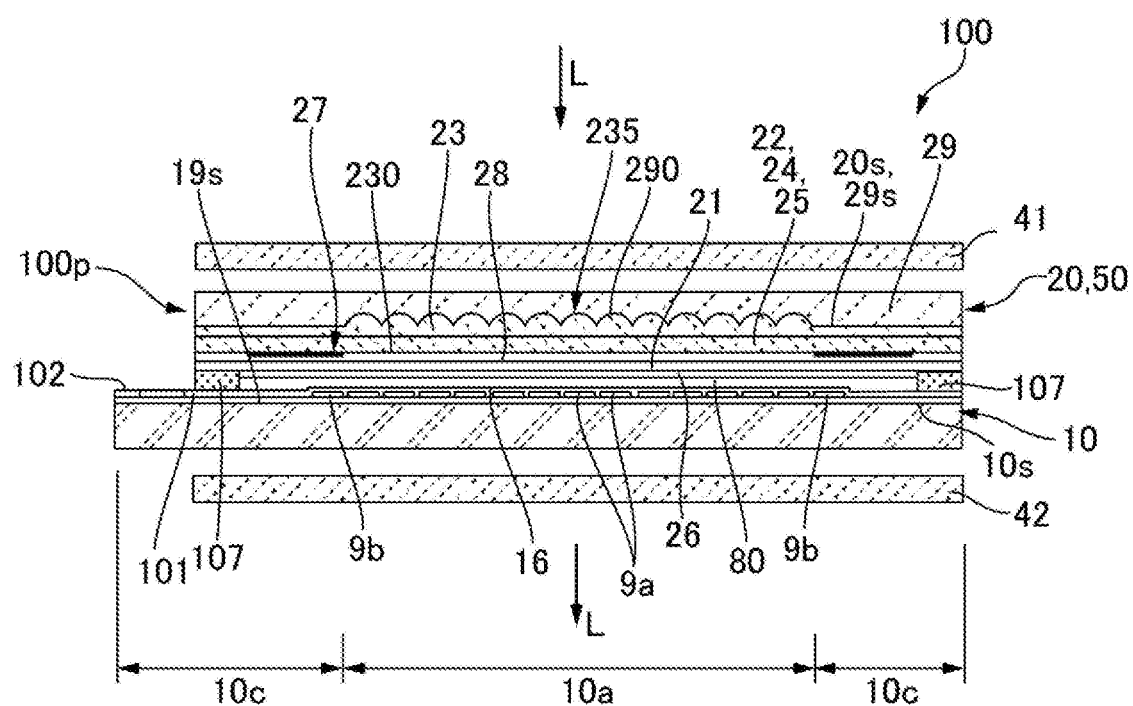
FIG. 2 is a cross-sectional view of the liquid crystal panel, for example, illustrated in FIG. 1.

Exemplary embodiments of the invention will be described with reference to the drawings. Note that in the drawings referred to in the description below, to illustrate each layer or each member at a recognizable size, each layer or each member is illustrated in a different scale.
Configuration of Liquid Crystal Apparatus
Overall Configuration FIG. 1 is a plan view of a liquid crystal panel 100p of a liquid crystal apparatus 100 to which the invention is applied. FIG. 2 is a cross-sectional view of the liquid crystal panel 100p, for example, illustrated in FIG. 1. As illustrated in FIGS. 1 and 2, the liquid crystal apparatus 100 includes the liquid crystal panel 100p including a first substrate 10 and a second substrate 20 bonded with each other by a sealing material 107 in a predetermined gap. In the liquid crystal panel 100p, the sealing material 107 is provided in a frame shape in circumference with an outer edge of the second substrate 20. Between the first substrate 10 and the second substrate 20, a liquid crystal layer 80 is disposed in an area surrounded by the sealing material 107. The sealing material 107, which includes an adhesive having a photocurable property or an adhesive having both a photocurable property and a thermosetting property, is made containing a glass fiber, or a gap material such as a glass bead for setting the distance between the substrates to a predefined value. The first substrate 10 and the second substrate 20 are each shaped into a quadrangular shape. At substantially center of the liquid crystal apparatus 100, a display area 10a described later is provided. The display area 10a has a quadrangular area, is arranged with a plurality of pixels, and is surrounded by a peripheral area 10c. In the exemplary embodiment, in the peripheral area 10c, areas adjacent to the display area 10a are formed with dummy pixel electrodes 9b simultaneously formed with first electrodes 9a.

The first substrate 10 is made from a transmissive substrate such as a quartz substrate or a glass substrate. The first substrate 10 has a surface 10s facing the second substrate 20. The peripheral area 10c on the surface 10s is formed with a data-line driving circuit 101 and a plurality of terminals 102 along a side of the first substrate 10. Adjacent to the side, scanning-line driving circuits 104 are respectively formed along other two sides. A flexible wiring substrate (not illustrated) is coupled to the terminals 102, and a variety of potentials and signals are input to the first substrate 10 via the flexible wiring substrate.

The display area 10a on the surface 10s of the first substrate 10 is provided with the first electrodes 9a and a first oriented film 16. The first electrodes 9a are transmissive and made from an Indium Tin Oxide (ITO) film, for example. The first oriented film 16 covers the first electrodes 9a. In the exemplary embodiment, the first electrodes 9a serve as a plurality of pixel electrodes respectively provided in the pixels.

The second substrate 20 is made from a transmissive substrate such as a quartz substrate or a glass substrate. The second substrate 20 has a surface 20s facing the first substrate 10. The surface 20s is formed with a second electrode 21 that is transmissive and made from an ITO film, for example. A second oriented film 26 is formed on the first substrate 10 side of the second electrode 21. The second electrode 21 serves as a common electrode formed substantially wholly over the second substrate 20, and is covered by the second oriented film 26. On the side of the surface 20s of the second substrate 20, i.e., the opposite side of the first substrate 10 to the second electrode 21, a light-shielding layer 27 is formed. The light-shielding layer 27 is made of resin, metal, or a metal compound to have light-shielding properties. Between the light-shielding layer 27 and the second electrode 21, a protective layer 28 that is transmissive is formed. The light-shielding layer 27 is formed as a parting extending along an outer circumference edge of the display area 10a. The display area 10a is defined by an inner edge of the light-shielding layer 27. The light-shielding layer 27 may be formed in a black matrix in areas overlapping, when viewed in a plan view, with areas each between adjacent ones of the first electrodes 9a.

The first oriented film 16 and the second oriented film 26 are organic oriented films made of polyimide, for example, or inorganic oriented films made of $SiO_x$ (x<2), for example. In the first oriented film 16 and the second oriented film 26, liquid crystal molecules having negative dielectric anisotropy used in the liquid crystal layer 80 are substantially vertically oriented. In this way, the liquid crystal apparatus 100 serves as a VA-mode liquid crystal apparatus.

The second substrate 20 is formed as a lens array substrate 50 formed with a plurality of lenses 235 overlapping with a plurality of the first electrodes 9a when viewed in a plan view in a one-to-one relationship. The lenses 235 are configured to effectively guide light onto an opening area of the pixels of the first substrate 10. To form the lenses 235, a surface 29s of a substrate main body 29 of the second substrate 20 (the surface 20s of the second substrate 20) is formed with recessed curved surfaces 290 at positions overlapping with the plurality of first electrodes 9a one to one. The substrate main body 29 is formed with a lens layer 23 covering the recessed curved surfaces 290. A surface 230 of the lens layer 23 lies opposite to the substrate main body 29, and is formed flat. Between the surface 230 and the protective layer 28, a ground layer 22, an optical compensation layer 25, and a light-transmission layer 24 described later, for example, are formed. The lens layer 23 is greater in refractive index than the substrate main body 29. For example, the substrate main body 29 is made from a glass substrate or a quartz substrate (refractive index=1.48). The lens layer 23 is made from a silicon oxynitride film (refraction=1.58 to 1.68), for example. Therefore, the lenses 235 have positive power.

In the peripheral area 10c of the first substrate 10, inter-substrate conduction electrodes 109 are formed in areas overlapping with corner portions of the second substrate 20. Inter-substrate conduction materials 109a containing conductive particles are disposed at the inter-substrate conduction electrodes 109. The second electrode 21 of the second substrate 20 is electrically coupled to the first substrate 10 via the inter-substrate conduction materials 109a and the inter-substrate conduction electrodes 109. Therefore, a common potential is applied to the second electrode 21 from the first substrate 10.

In the liquid crystal apparatus 100 according to the exemplary embodiment, the first electrodes 9a and the second electrode 21 are made of an ITO film (transmissive conductive film). The liquid crystal apparatus 100 thus serves as a transmissive liquid crystal apparatus. The liquid crystal apparatus 100 displays an image in a manner that, while light enters from the second substrate 20, as indicated by an arrow L in FIG. 2, passes through and exits the first substrate 10, the light is modulated by the liquid crystal layer 80 for each of the pixels. When the liquid crystal apparatus 100 is used in an electronic apparatus such as a projection-type display apparatus, a first polarized light element 41 is disposed adjacent to the second substrate 20, while a second polarized light element 42 is disposed adjacent to the first substrate 10. The first polarized light element 41 and the second polarized light element 42 are disposed in a crossed Nichol manner to allow respective polarized light axes to be orthogonal to each other.

Electrical Configuration of Liquid Crystal Apparatus 100 and Other Components

Figure 3:
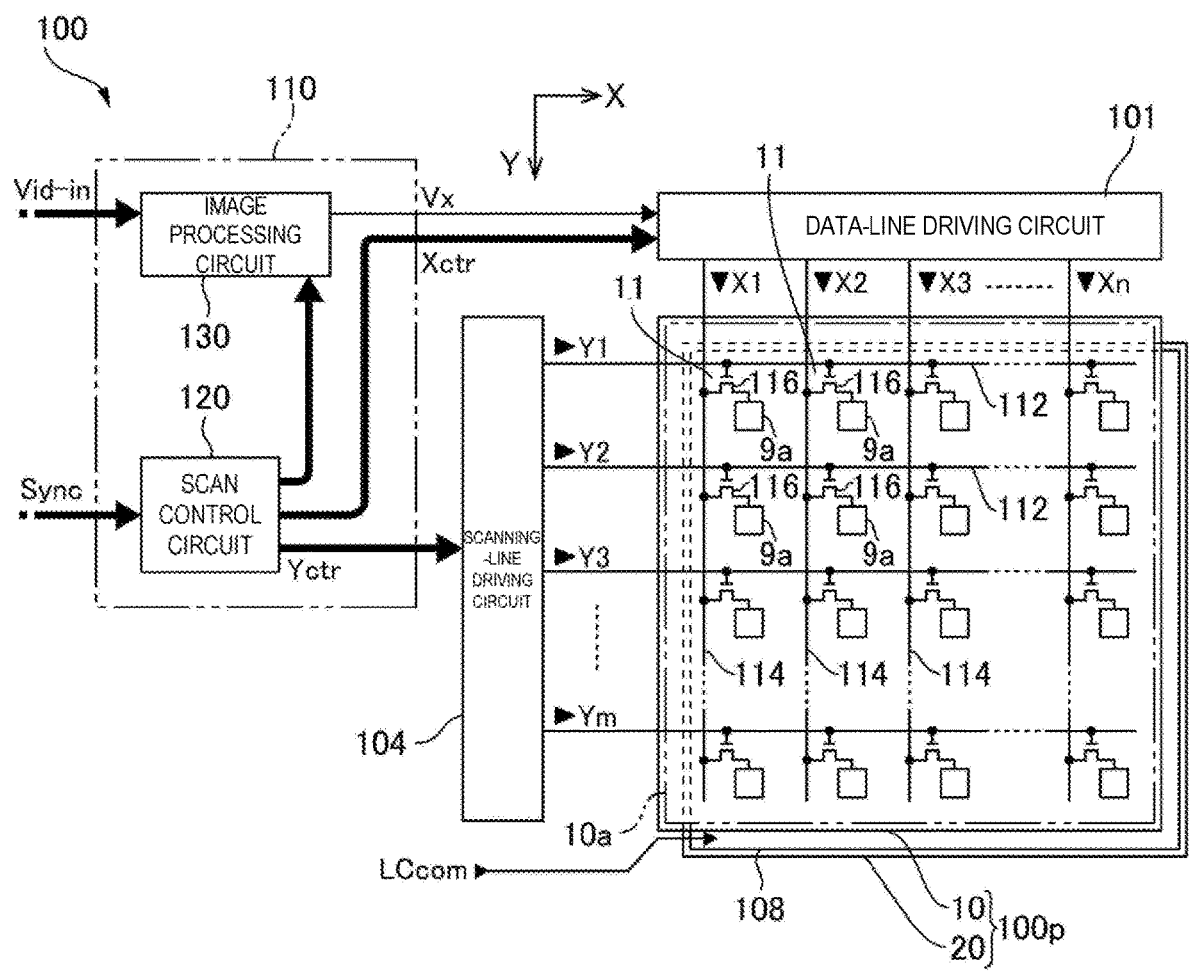
FIG. 3 is an explanatory view illustrating an electrical configuration of the liquid crystal apparatus illustrated in FIG. 1.
Figure 4:
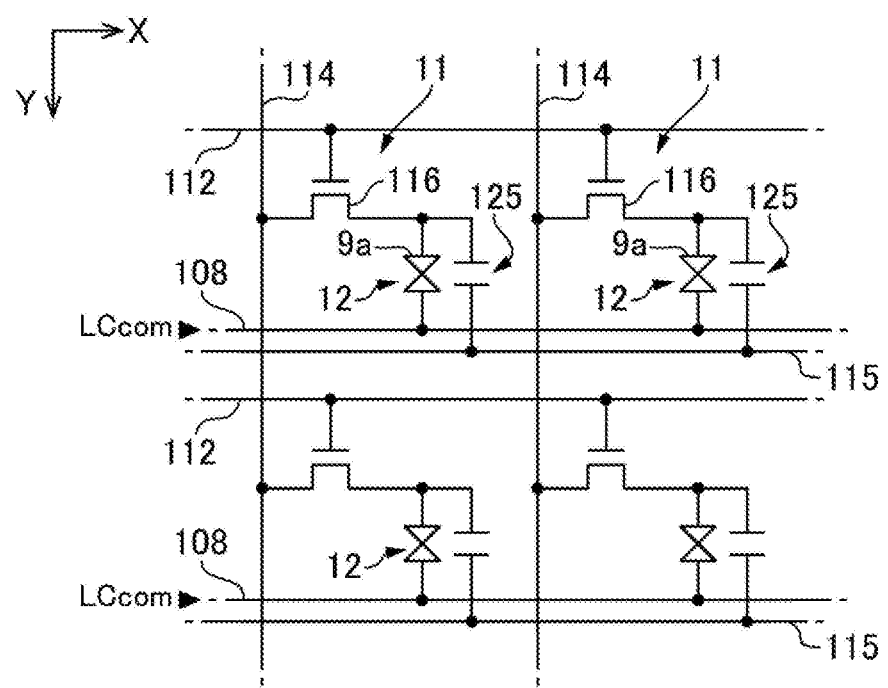
FIG. 4 is an explanatory view illustrating an electrical configuration of pixels illustrated in FIG. 3.

FIG. 3 is an explanatory view illustrating an electrical configuration of the liquid crystal apparatus 100 illustrated in FIG. 1. FIG. 4 is an explanatory view illustrating an electrical configuration of pixels illustrated in FIG. 3.

As illustrated in FIG. 3, the liquid crystal apparatus 100 according to the exemplary embodiment includes a control circuit 110 and the liquid crystal panel 100p. In the exemplary embodiment, the scanning-line driving circuits 104 and the data-line driving circuit 101 are integrated into the liquid crystal panel 100p. The control circuit 110 is to be supplied with an image signal Vid-in from a host device in synchronization with a synchronizing signal Sync. The image signal Vid-in is digital data specifying tone levels for the pixels in the liquid crystal panel 100p, and is to be supplied in an order of scanning in accordance with a vertical scan signal, a horizontal scan signal, and a dot clock signal contained in the synchronizing signal Sync. Although the image signal Vid-in specifies a tone level, the tone level specifies a voltage to be applied between each of the first electrodes 9a and the second electrode 21 illustrated in FIG. 2. Therefore, it can be said that the image signal Vid-in specifies a voltage to be applied. The control circuit 110 includes a scan control circuit 120 and an image processing circuit 130. The scan control circuit 120 is configured to generate various control signals to control other components in synchronization with the synchronizing signal Sync. The image processing circuit 130 is configured to process the digital image signal Vid-in to allow a voltage to be applied between each of the first electrodes 9a and the second electrode 21 to reach a voltage corresponding to a tone level specified by the image signal Vid-in, and to output an analog data signal Vx corresponding to the tone level specified by the digital image signal Vid-in.

In the liquid crystal panel 100p, the first substrate 10 has the surface facing the second substrate 20. On the surface, a plurality of (m rows of) scanning lines 112 extend in an X (horizontal) direction, while a plurality of (n columns) of data lines 114 extend in a Y (vertical) direction. The scanning lines 112 and the data lines 114 are provided to be electrically insulated from each other. In the exemplary embodiment, for identification purpose, each of the scanning lines 112 will sometimes be referred to as 1st row, 2nd row, 3rd row, . . . , (m−1)-th row, and m-th row from top in the drawings. Similarly, for identification purpose, each of the data lines 114 will sometimes be referred to as 1st column, 2nd column, 3rd column, . . . , (n−1)-th column, n-th column in order from left in the drawings.

At positions corresponding to intersections between the scanning lines 112 and the data lines 114 on the first substrate 10, n-channel-type thin film transistors (TFTs) 116 (pixel switching elements) and the first electrodes 9a are respectively provided in pairs. Gate electrodes of the TFTs 116 are respectively coupled to the scanning lines 112. Source electrodes are respectively coupled to the data lines 114. Drain electrodes are respectively coupled to the first electrodes 9a. The second electrode 21 of the second substrate 20 is to be applied with a common potential LCcom via common potential lines 108.

As illustrated in FIG. 4, a plurality of pixels 11 are configured at the positions corresponding to the intersections between the scanning lines 112 and the data lines 114. The plurality of pixels are respectively provided with liquid crystal elements 12 in which the liquid crystal layer 80 is disposed between the first electrodes 9a and the second electrode 21. Although not illustrated in FIG. 3, the liquid crystal panel 100p is provided with retention capacitors 125 respectively in parallel to the liquid crystal elements 12. The retention capacitors 125 respectively have ends coupled to the first electrodes 9a and other ends commonly coupled to capacitance lines 115. The capacitance lines 115 are coupled to the common potential lines 108, and are applied with the common potential LCcom.

When one of the scanning lines 112 goes an H level based on a control signal Yctr, a corresponding one of the TFTs 116, which is coupled via its gate electrode to the one of the scanning lines 112, comes on. Therefore, a corresponding one of the first electrodes 9a is coupled to a corresponding one of the data lines 114. While the one of the scanning lines 112 is at the H level, when the data-line driving circuit 101 supplies the data signal Vx supplied from the image processing circuit 130 via the corresponding one of the data lines 114 based on a scanning control signal Xctr, the data signal is applied to the corresponding one of the first electrodes 9a via the corresponding one of the TFTs 116 being turned on. When the one of the scanning lines 112 reaches an L level, the corresponding one of the TFTs 116 goes off. However, the voltage being applied to the corresponding one of the first electrodes 9a is retained by the capacitance of a corresponding one of the liquid crystal elements 12 and a corresponding one of the auxiliary capacitors 125.

In the liquid crystal elements 12, the liquid crystal molecules 85 change a molecular orientation state in accordance with an electric field generated by each of the first electrodes 9a and the second electrode 21. When the liquid crystal elements 12 are a transmissive type, transmittance in accordance with an applied, retained voltage is achieved. At that time, in the liquid crystal panel 100p, the liquid crystal elements 12 respectively change in transmittance. Therefore, the liquid crystal elements 12 correspond to the pixels 11. The display area 10a represents an area arranged with the pixels 11. In the exemplary embodiment, the liquid crystal apparatus 100 is a normally black mode under which the liquid crystal elements 12 are black when no voltage is applied.

Configuration of Liquid Crystal Layer 80 and Other Components

Figure 5:
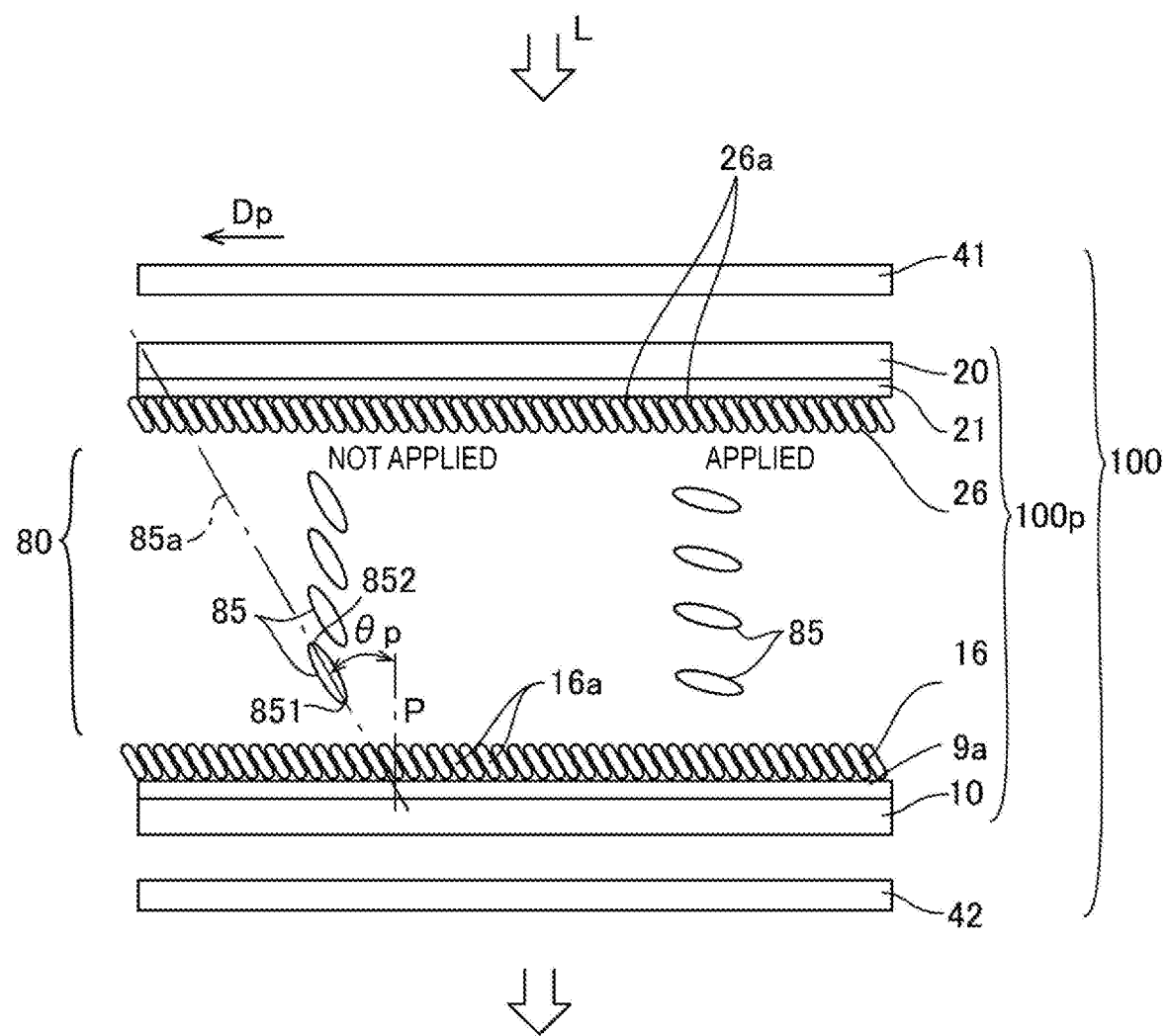
FIG. 5 is an explanatory view of liquid crystal molecules, for example, used in a liquid crystal layer of the liquid crystal apparatus illustrated in FIG. 1.
Figure 6:
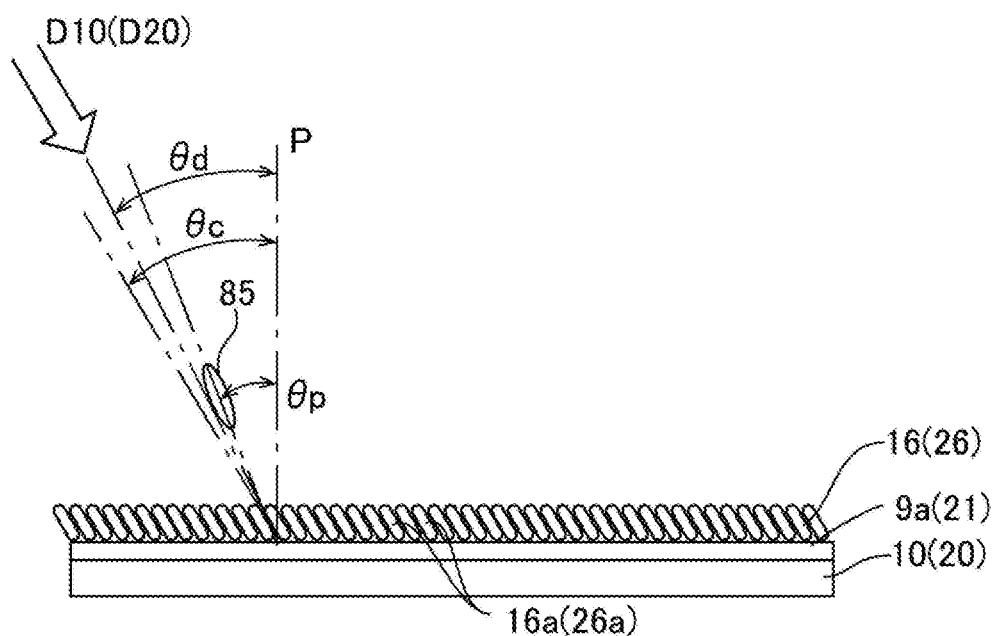
FIG. 6 is an explanatory view of a method, for example, for forming a first oriented film and a second oriented film of the liquid crystal apparatus illustrated in FIG. 1.

FIG. 5 is an explanatory view of the liquid crystal molecules 85, for example, used in the liquid crystal layer 80 of the liquid crystal apparatus 100 illustrated in FIG. 1. FIG. 6 is an explanatory view of a method, for example, for forming the first oriented film 16 and the second oriented film 26 of the liquid crystal apparatus 100 illustrated in FIG. 1.

In the exemplary embodiment, the first oriented film 16 and the second oriented film 26 illustrated in FIG. 2 are oblique deposition films (inorganic oriented films) made of $SiO_x$ (x<2), $SiO_2$, $TiO_2$, MgO, or $Al_2O_3$, for example. Therefore, as illustrated in FIG. 5, the first oriented film 16 and the second oriented film 26 respectively have columnar structure bodies having columnar bodies 16a and 26a referred to as columns respectively formed diagonally with respect to the first substrate 10 and the second substrate 20. Thus, in the first oriented film 16 and the second oriented film 26, the liquid crystal molecules 85 having negative dielectric anisotropy and used in the liquid crystal layer 80 are oriented diagonally with respect to the first substrate 10 and the second substrate 20 to allow the liquid crystal molecules 85 to be pre-tilted. While no voltage is applied between the first electrodes 9a and the second electrode 21, a pre-tilt angle θp denotes an angle formed between a normal line direction P with respect to the first substrate 10 and the second substrate 20 and a long axis direction (orientation direction) of the liquid crystal molecules 85. The pre-tilt angle θp substantially ranges from 3° to 5°, for example. In the exemplary embodiment, a positive tilt is applied. Under the positive tilt, the liquid crystal molecules 85 and the columnar bodies 16a and 26a are inclined in an identical direction.

A pre-tilt orientation Dp of the liquid crystal molecules 85 represents an orientation toward which an end 852, adjacent to the second substrate 20, of each of the liquid crystal molecules 85 in a long axis direction 85a faces with respect to an end 851, adjacent to the first substrate 10, of each of the liquid crystal molecules 85. In the liquid crystal apparatus 100, when a drive voltage is applied between the first electrodes 9a and the second electrode 21, the liquid crystal molecules 85 incline in the pre-tilt orientation Dp.

The liquid crystal apparatus 100 is disposed between the pair of polarized light elements disposed in a crossed Nichol manner to allow the pre-tilt orientation Dp to form an angle of 45° with respect to a transmission axis or an absorption axis of the polarized light elements.

In the exemplary embodiment, for example, as illustrated in FIG. 1, an orientation D10 representing a deposition direction when the first oriented film 16 is formed heads from 0730 o'clock to 0130 o'clock, for example. At that time, a direction in which the columnar bodies 16a grow heads from 0130 o'clock to 0730 o'clock. An orientation D20 representing a deposition direction when the second oriented film 26 is formed heads from 0130 o'clock to 0730 o'clock. At that time, a direction in which the columnar bodies 26a grow heads from 0730 o'clock to 0130 o'clock. Therefore, the pre-tilt orientation Dp of the liquid crystal molecules 85 heads from 0130 o'clock to 0730 o'clock. The pre-tilt orientation Dp intersects with the first direction X and the second direction Y, respectively, at an angle of 45°.

As illustrated in FIG. 6, to form the first oriented film 16, deposition is performed in the orientation D10. At that time, the deposition is performed diagonally at an angle θd from the normal line direction P with respect to the first substrate 10. As a result, in the first oriented film 16, the columnar bodies 16a are formed diagonally at an angle θc with the normal line direction P with respect to the first substrate 10. At that time, the angle θc of the columnar bodies 16a is not always identical to the angle θd of the deposition. However, the angle θc of the columnar bodies 16a is controlled by the angle θd of the deposition.

The liquid crystal molecules 85 are pre-tilted by an orientation restriction force of the first oriented film 16. At that time, the pre-tilt angle θp is not always identical to the angle θc of the columnar bodies 16a. However, the pre-tilt angle θp is controlled by the angle θc of the columnar bodies 16a. Therefore, the pre-tilt angle θp is controlled by the angle θd of the deposition.

The second oriented film 26 has a configuration identical to the configuration of the first oriented film 16. Therefore, like numbers in parentheses reference like components in FIG. 6, and description of the like components are omitted.

Configuration of Optical Compensation Layer 25

Figure 7:
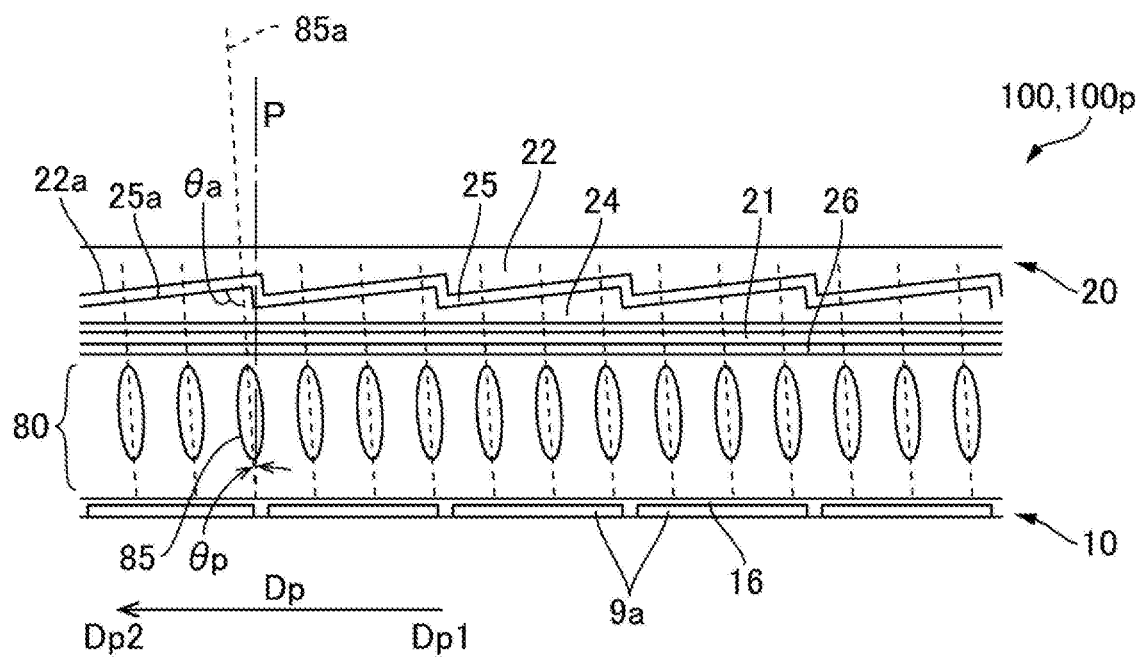
FIG. 7 is an explanatory view of an optical compensation layer, for example, of the liquid crystal apparatus illustrated in FIG. 1.
Figure 8:
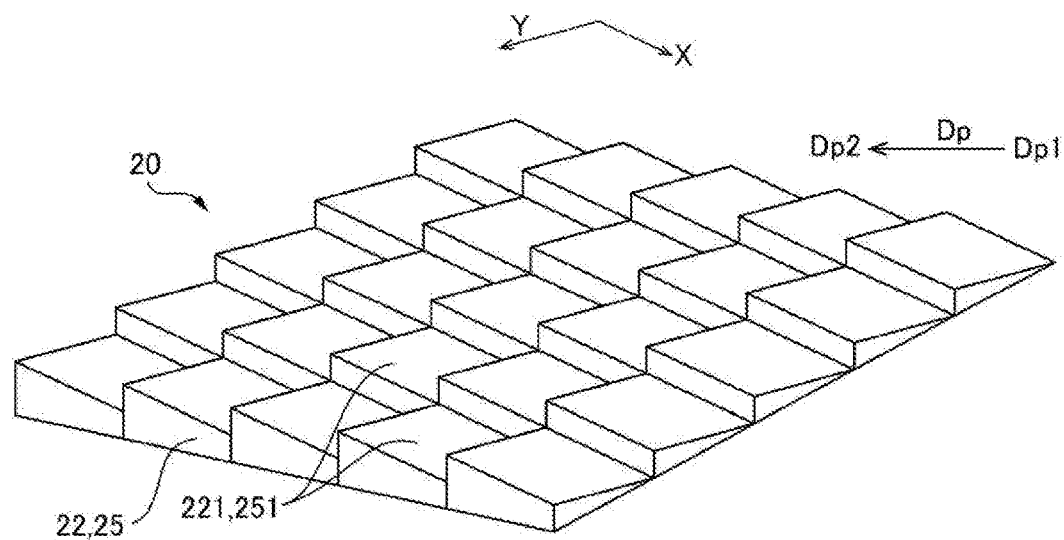
FIG. 8 is an explanatory view illustrating a shape of the optical compensation layer illustrated in FIG. 7.

FIG. 7 is an explanatory view of the optical compensation layer 25, for example, of the liquid crystal apparatus 100 illustrated in FIG. 1. FIG. 8 is an explanatory view illustrating a shape of the optical compensation layer 25 illustrated in FIG. 7. As illustrated in FIG. 7, the second substrate 20 of the liquid crystal apparatus 100 according to the exemplary embodiment is formed with the ground layer 22, the optical compensation layer 25, and the light-transmission layer 24 in order between the lens layer 23 and the protective layer 28. The ground layer 22 and the optical compensation layer 25 are transmissive.

A surface of the ground layer 22 faces the first substrate 10, and is formed with a plurality of inclined surfaces 22a.

The surface of the ground layer 22, which faces the first substrate 10, is further formed with the optical compensation layer 25. The optical compensation layer 25 is formed to have a substantially constant film thickness. A surface of the optical compensation layer 25 faces the first substrate 10 and is formed with a plurality of inclined surfaces 25a having a shape reflected with a shape of the plurality of inclined surfaces 22a of the ground layer 22. The light-transmission layer 24 is laminated on the surface, facing the first substrate 10, of the optical compensation layer 25. A surface of the light-transmission layer 24 faces the first substrate 10 and is flat.

The structure can be achieved by following a method described below, for example. First, after the ground layer 22 is film-formed, an etching mask, such as a gray scale mask, is formed. After that, etching is performed to form the inclined surfaces 22a. At that time, etching, for example, may be further utilized to shape the inclined surfaces 22a. Next, after the optical compensation layer 25 is formed through a chemical vapor deposition (CVD) method or a physical vapor deposition (PVD) method, the light-transmission layer 24 is formed. Next, the light-transmission layer 24 is surface-smoothed.

The ground layer 22 and the light-transmission layer 24 are made from silicon oxide films. The optical compensation layer 25 is a multi-layer film alternately laminated with a low refractive index layer such as a silicon oxide film and a high refractive index layer such as a tantalum oxide film, a niobium oxide film, a titanium oxide film, a silicon nitride film, or a silicon oxynitride film.

In the exemplary embodiment, the pre-tilt angle θp of the liquid crystal molecules 85 is set to an angle smaller than an angle when the long axis direction 85a forms an angle of 90° with respect to each of the inclined surfaces 25a. That is, while each of the first electrodes 9a and the second electrode 21 are not applied with voltage, an angle θa between the long axis direction 85a of the liquid crystal molecules 85 and each of the inclined surfaces 25a is smaller than 90°. That is, when it is assumed that, when the pre-tilt angle θp of the liquid crystal molecules 85 is an angle α, an angle between the long axis direction 85a of the liquid crystal molecules 85 and each of the inclined surfaces 25a is 90°, the pre-tilt angle θp in the liquid crystal apparatus 100 according to the exemplary embodiment falls within a range described below. The configuration is achieved by adjusting an angle θd used for vapor deposition described with reference to FIG. 6.

$$0° < θp < α$$

In the liquid crystal apparatus 100 configured as described above, in the liquid crystal layer 80, the liquid crystal molecules 85 are pre-tilted, while the second substrate 20 is provided with the optical compensation layer 25 having the inclined surfaces 25a facing the first substrate 10. While the long axis direction 85a of the liquid crystal molecules 85 forms an angle of 90° with respect to each of the inclined surfaces 25a, the optical compensation layer 25 compensates elliptically polarized light components. Different from a case when a separate optical compensation plate is provided, an angle adjustment for the optical compensation plate, which requires a greater effort when assembling an electronic apparatus, such as a projection-type display apparatus, is not therefore advantageously required.

In the exemplary embodiment, however, the pre-tilt angle θp of the liquid crystal molecules 85 during production is set smaller than an angle when the long axis direction 85a of the liquid crystal molecules 85 forms an angle of 90° with respect to each of the inclined surfaces 25a. When each of the first electrodes 9a and the second electrode 21 are applied with no voltage, the optical compensation layer 25 cannot fully compensate elliptically polarized light components. Even in this case, because the liquid crystal molecules 85 have negative dielectric anisotropy, when a voltage is applied to each of the first electrodes 9a and the second electrode 21, the long axis direction 85a of the liquid crystal molecules 85 can be inclined to form an angle of 90° with respect to each of the inclined surfaces 25a. Elliptically polarized light components can therefore be compensated. Even in a configuration incorporated with the optical compensation layer 25, a reduction in display quality due to variations in the pre-tilt angle θp of the liquid crystal molecules 85 and thus increases in retardation can therefore be suppressed.

Method for Driving Liquid Crystal Apparatus 100

Figure 9:
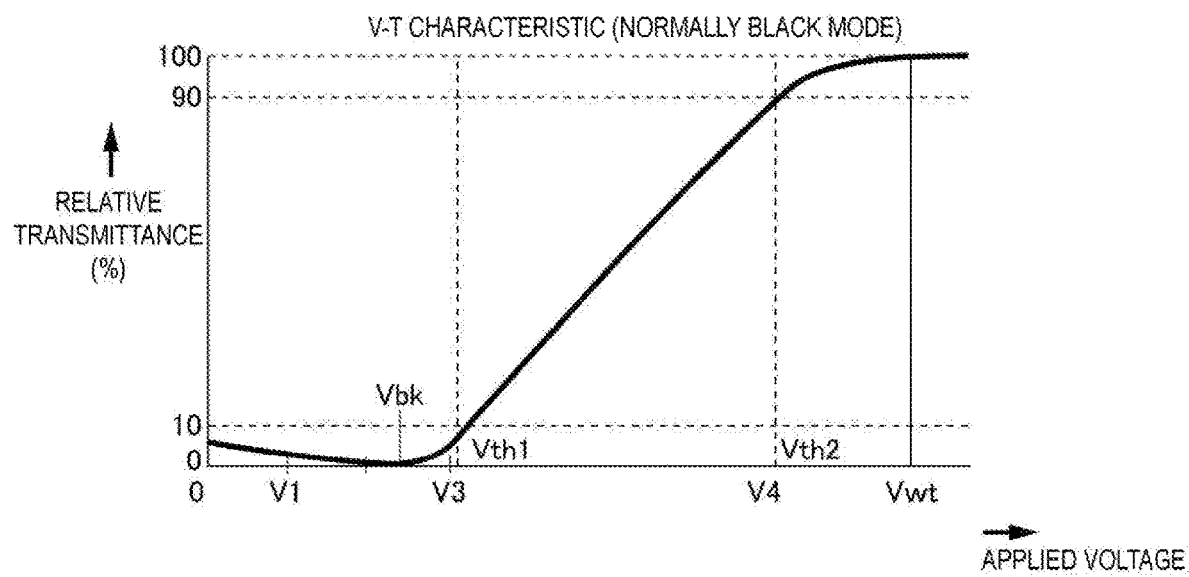
FIG. 9 is an explanatory view of a tone voltage, for example, in the liquid crystal apparatus illustrated in FIG. 1.

FIG. 9 is an explanatory view of a tone voltage, for example, in the liquid crystal apparatus 100 illustrated in FIG. 1. FIG. 9 illustrates a relationship (V-T characteristic: relative transmittance-voltage characteristic) between a voltage to be applied to the liquid crystal layer 80 (potential difference between each of the first electrodes 9a and the second electrode 21) and relative transmittance of light to be emitted from the liquid crystal panel 100p. In the exemplary embodiment, in the V-T characteristic illustrated in FIG. 9, a maximum drive voltage Vwt represents a voltage to be applied and corresponding to a tone level (maximum tone level) at which brightest white is displayed. A minimum drive voltage Vbk represents a voltage to be applied and corresponding to a tone level (minimum tone level) at which darkest black is displayed. In the liquid crystal apparatus 100 according to the exemplary embodiment, the minimum drive voltage Vbk, the maximum drive voltage Vwt, and a voltage between the minimum drive voltage Vbk and the maximum drive voltage Vwt are therefore to be applied from the image processing circuit 130 illustrated in FIG. 3 to the pixels. The pixels then emit light at intensity corresponding to the tone.

In the exemplary embodiment, the minimum drive voltage Vbk corresponding to the minimum tone level and representing a potential difference (voltage to be applied) between each of the first electrodes 9a and the second electrode 21 is set higher than 0 V, but lower than a first threshold voltage Vth1 at which relative transmittance is 10%. When a voltage at which relative transmittance is 10% is specified to the first threshold voltage Vth1, while a voltage at which relative transmittance is 90% is specified to a second threshold voltage Vth2, a voltage difference between the minimum drive voltage Vbk and the first threshold voltage Vth1 is therefore smaller than a voltage difference between the maximum drive voltage Vwt and the second threshold voltage Vth2.

In the exemplary embodiment, a range of voltage to be applied from 0 V to below the minimum drive voltage Vbk is not used in ordinary display. When a voltage to be applied is increased gradually from 0 V to a voltage V1, a voltage V2, a voltage V3, etc., the V-T characteristic renders a curve, where the relative transmittance once gradually decreases to a minimum value at the minimum drive voltage Vbk, then increases. Around a voltage V4, a region appears wherein a rate of increase in relative transmittance plummets. At the voltage V4, an increase in relative transmittance starts to saturate.

The reason relative transmittance is higher than relative transmittance at which a voltage being applied is the minimum drive voltage Vbk in the V-T characteristic illustrated in FIG. 9 when a voltage being applied is 0 V is that the pre-tilt angle θp of the liquid crystal molecules 85 is set smaller than an angle when the long axis direction 85a of the liquid crystal molecules 85 forms an angle of 90° with respect to each of the inclined surfaces 25a.

As described above, with the liquid crystal apparatus 100 and the method for driving the liquid crystal apparatus 100, according to the exemplary embodiment, when a voltage difference between each of the first electrodes 9a and the second electrode 21 is 0 V, the optical compensation layer 25 cannot fully compensate elliptically polarized light components. However, by setting a voltage difference between each of the first electrodes 9a and the second electrode 21 to the minimum drive voltage Vbk, the long axis direction 85a of the liquid crystal molecules 85 can be inclined to form an angle of 90° with respect to each of the inclined surfaces 25a. Elliptically polarized light components can therefore be compensated. Even when the minimum drive voltage Vbk is applied, light can therefore be prevented from leaking, achieving higher contrast.

Different from a case when the minimum drive voltage Vbk is fixed to 0 V, the minimum drive voltage Vbk, for example, can be set while inspecting an optical property of the liquid crystal apparatus 100 after the liquid crystal apparatus 100 is produced. The minimum drive voltage Vbk, for example, can therefore be appropriately set by taking into account a distortion in image due to the optical compensation layer 25 and angle distribution of light source light, for example.

When the minimum drive voltage Vbk is applied, the liquid crystal molecules 85 are applied with a vertical electric field. Effects from a horizontal electric field from adjacent ones of the first electrodes 9a can therefore be reduced. When the minimum drive voltage Vbk is applied to one of the first electrodes 9a, and a drive voltage higher than the first threshold voltage Vth1 is applied to adjacent ones of the first electrodes 9a, such an event that a reverse tilt domain occurs would therefore be less likely to occur. Disinclination can also be suppressed from occurring. The maximum drive voltage Vwt can thus be set higher, improving transmittance. Further, the pre-tilt angle θp is set to a smaller angle, advantageously improving responsiveness from white display to black display.

Another Exemplary Embodiment

Figure 10:
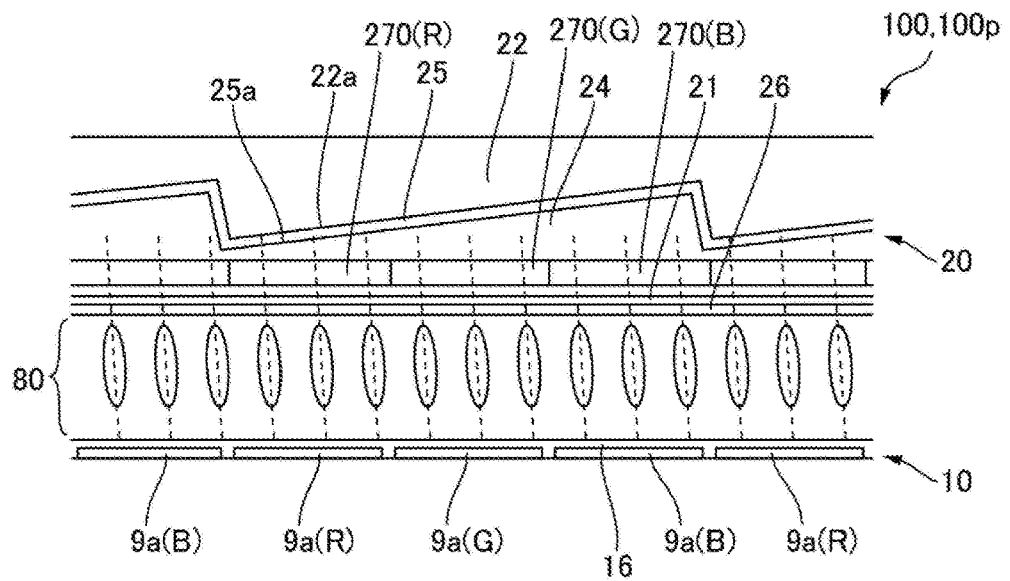
FIG. 10 is an explanatory view of a liquid crystal apparatus according to another exemplary embodiment of the invention.

FIG. 10 is an explanatory view of a liquid crystal apparatus 100 according to another exemplary embodiment of the invention. In the exemplary embodiment described above, each of the first electrodes 9a is provided with each of the inclined surfaces 25a. However, depending on an arrangement of the first electrodes 9a and the pre-tilt orientation Dp, for example, such an aspect may be adopted that each of the inclined surfaces 25a is provided for some of the plurality of first electrodes 9a.

For example, the liquid crystal apparatus 100 illustrated in FIG. 10 is a direct-viewing type display apparatus including the second substrate 20 provided with color filters 270(R), 270(G), and 270(B) respectively corresponding to red, green, and blue. The inclined surfaces 25a are respectively provided with first electrodes 9a(R) for red pixels, first electrodes 9a(G) for green pixels, and first electrodes 9a(B) for blue pixels. The invention may be applied to the liquid crystal apparatus 100.

Other Exemplary Embodiments

In the exemplary embodiments described above, on the second substrate 20 formed with the optical compensation layer 25, the second electrode 21 serves as the common electrode, while the first electrodes 9a of the first substrate 10 serve as the first electrodes 9a. However, the invention may be applied to a configuration where pixel electrodes serving as second electrodes are provided on the second substrate 20 formed with the optical compensation layer 25, while the first substrate 10 is provided with the second electrode 21 serving as a first electrode. In the exemplary embodiments described above, the liquid crystal apparatus 100 is a transmissive type. However, the invention may be applied when the liquid crystal apparatus 100 is a reflective type.

Installation Example for Electronic Apparatus

Figure 11:
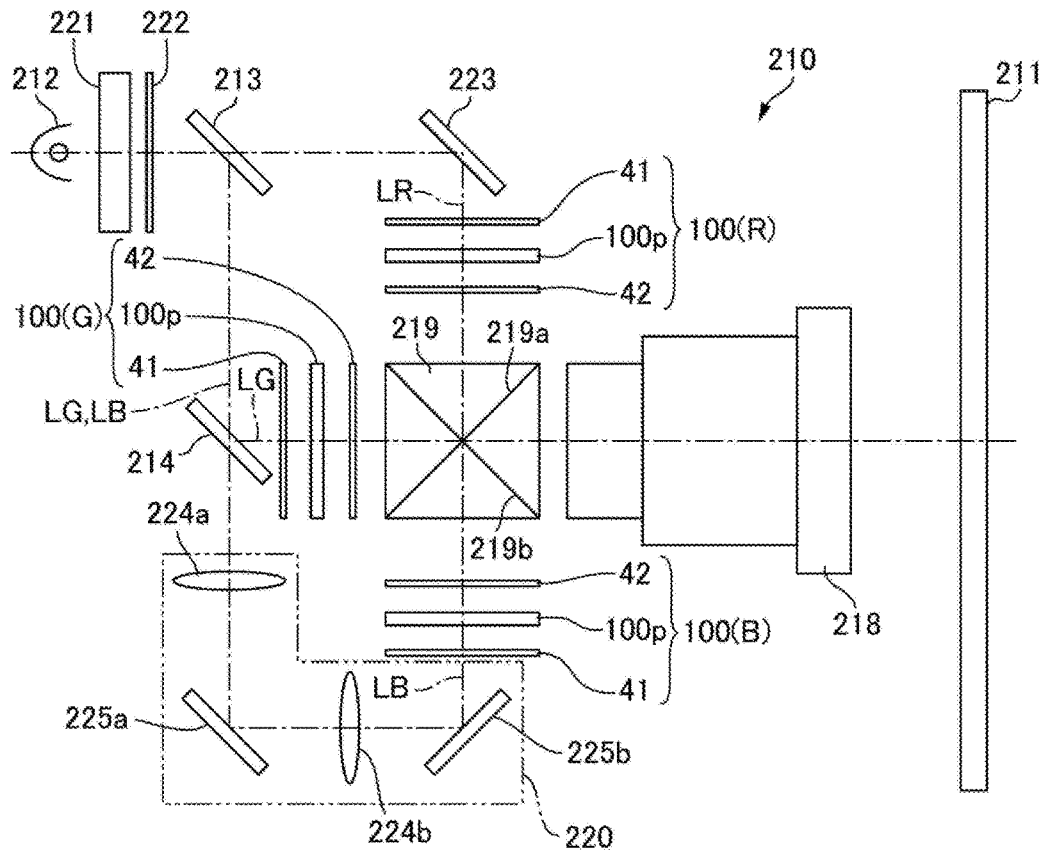
FIG. 11 is a schematic block diagram illustrating a projection-type display apparatus (electronic apparatus) employing the liquid crystal apparatus to which the invention is applied.

FIG. 11 is a schematic block diagram of a projection-type display apparatus (electronic apparatus) employing the liquid crystal apparatus 100 to which the invention is applied. As described below, a plurality of liquid crystal apparatuses 100(R), (G), and (B) configured to supply light varying in wavelength region are used. In the liquid crystal apparatuses 100(R), (G), and (B), the liquid crystal apparatuses 100 to which the invention is applied are used.

A projection-type display apparatus 210 illustrated in FIG. 11 is a forward projection type projector configured to project an image on a screen 211 provided in front of the projector. The projection-type display apparatus 210 includes a light source 212, dichroic mirrors 213 and 214, the liquid crystal apparatuses 100(R), (G), and (B), a projection optical system 218, a cross dichroic prism 219, and a relay system 220. The liquid crystal apparatuses 100(R), (G), and (B) each include a first polarized light element 41, the liquid crystal panel 100p, and a second polarized light element 42.

The light source 212 is an extra-high pressure mercury lamp configured to supply light including red light, green light, and blue light, for example. The dichroic mirror 213 is configured to allow red light LR from the light source 212 to pass through, as well as to reflect green light LG and blue light LB. The dichroic mirror 214 is configured to allow, among the green light LG and the blue light LB reflected by the dichroic mirror 213, the blue light LB to pass through, as well as to reflect the green light LG. As described above, the dichroic mirrors 213 and 214 configure a color separation optical system configured to separate light emitted from the light source 212 into the red light LR, the green light LG, and the blue light LB. Between the dichroic mirror 213 and the light source 212, an integrator 221 and a polarization conversion element 222 are disposed in order from the light source 212. The integrator 221 is configured to evenly distribute light emitted from the light source 212. The polarization conversion element 222 is configured to convert light emitted from the light source 212 into polarized light in a certain vibration direction such as "s" polarized light, for example.

The liquid crystal apparatus 100(R) is configured to modulate, in accordance with an image signal, the red light LR passed through the dichroic mirror 213 and reflected by the reflecting mirror 223. The red light LR enters the liquid crystal apparatus 100(R), passes through the first polarized light element 41 and is converted into "s" polarized light, for example. The liquid crystal panel 100p is configured to convert the "s" polarized light that has entered into "p" polarized light through modulation in accordance with an image signal (for half tone, circularly polarized light or elliptically polarized light). Further, the second polarized light element 42 is configured to block the "s" polarized light, but allow the "p" polarized light to pass through. Therefore, the liquid crystal apparatus 100(R) modulates the red light LR in accordance with an image signal and emits the red light LR being modulated toward the cross dichroic prism 219.

The liquid crystal apparatus 100(G) modulates, in accordance with an image signal, the green light LG reflected by the dichroic mirror 213 and then reflected by the dichroic mirror 214 and emits the green light LG being modulated toward the cross dichroic prism 219.

The liquid crystal apparatus 100(B) modulates, in accordance with an image signal, the blue light LB reflected by the dichroic mirror 213 and passed through the dichroic mirror 214 and then the relay system 220 and emits the blue light LB being modulated toward the cross dichroic prism 219.

The relay system 220 includes relay lenses 224a and 224b and reflecting mirrors 225a and 225b. The relay lenses 224a and 224b are provided to prevent an optical loss in the blue light LB due to its longer optical path. The relay lens 224a is disposed between the dichroic mirror 214 and the reflecting mirror 225a.

The relay lens 224b is disposed between the reflecting mirrors 225a and 225b. The reflecting mirror 225a is disposed to reflect the blue light LB that has passed through the dichroic mirror 214 and emitted from the relay lens 224a toward the relay lens 224b. The reflecting mirror 225b is disposed to reflect the blue light LB emitted from the relay lens 224b toward the liquid crystal apparatus 100(B).

The cross dichroic prism 219 is a color synthesizing optical system including two dichroic films 219a and 219b disposed to be orthogonal to each other in an X-letter shape. The dichroic film 219a reflects the blue light LB, but allows the green light LG to pass through. The dichroic film 219b reflects the red light LR, but allows the green light LG to pass through.

Therefore, the cross dichroic prism 219 is configured to synthesize the red light LR, the green light LG, and the blue light LB respectively modulated by the liquid crystal apparatuses 100(R), (G), and (B), and to emit the red light LR, the green light LG, and the blue light LB being modulated toward the projection optical system 218. The projection optical system 218 includes a projection lens (not illustrated), and is configured to project light synthesized by the cross dichroic prism 219 to the screen 211.

Such a configuration may be adopted that the liquid crystal apparatuses 100(R) and (B) for red and blue are provided with λ/2 phase difference compensation elements. In this configuration, light emitted from the liquid crystal apparatuses 100(R) and (B) and entering the cross dichroic prism 219 serves as "s" polarized light. The liquid crystal apparatus 100(G) is not provided with a λ/2 phase difference compensation element. Light emitted from the liquid crystal apparatus 100(G) and entering the cross dichroic prism 219 serves as "p" polarized light.

By allowing different kinds of polarized light to enter the cross dichroic prism 219, such a color synthesizing optical system that is optimized by taking into account reflection properties of the dichroic films 219a and 219b can be achieved. The dichroic films 219a and 219b are superior in reflection properties for "s" polarized light in general. Therefore, as described above, the red light LR and the blue light LB reflected by the dichroic films 219a and 219b may serve as "s" polarized light. The green light LG that has passed through the dichroic films 219a and 219b may serve as "p" polarized light.

Other Projection-Type Display Apparatuses

A projection-type display apparatus may be configured to use, as a light source unit, an LED light source or a laser light source configured to emit light in various colors, and the like to supply light in various colors emitted from the light source to another liquid crystal apparatus.

The liquid crystal apparatus to which the invention is applied may be used, in addition to the electronic apparatus described above, in various electronic apparatuses including projection type head-up displays (HUDs) and direct-viewing type head-mounted displays (HMDs), for example.

The entire disclosure of Japanese Patent Application No. 2018-032902, filed Feb. 27, 2018 is expressly incorporated by reference herein.

What is claimed is:

1. A liquid crystal apparatus comprising:
   a first substrate provided, at one surface side thereof, with adjacent first electrodes and a first oriented film covering the first electrodes;
   a second substrate provided, at one surface side thereof, with a ground layer having a first inclined surface corresponding to one of the first electrodes and a second inclined surface corresponding to a space between the first electrodes, an optical compensation layer having a first portion that is provided along the first inclined surface and a second portion that is provided along the second inclined surface, a second electrode provided at the first substrate side of the optical compensation layer, and a second oriented film covering the second electrode; and
   a liquid crystal layer including liquid crystal molecules having negative dielectric anisotropy, the liquid crystal layer being provided between the first substrate and the second substrate, wherein
   incident light is vertically incident on the one surface side of the first substrate and the one surface side of the second substrate, and
   in a state where no voltage is applied to the liquid crystal layer, an angle between a long axis direction of the liquid crystal molecules and the first inclined surface is set to an angle smaller than 90°.

2. The liquid crystal apparatus according to claim 1, wherein
   the liquid crystal layer is a normally black mode, and
   a minimum drive voltage corresponding to a minimum tone level is higher than 0 V, but lower than a threshold voltage at which, in a relative transmittance-voltage characteristic indicative of a relationship between a voltage to be applied to the liquid crystal layer and relative transmittance, the relative transmittance is 10%.

3. The liquid crystal apparatus according to claim 2, wherein the relative transmittance when a voltage to be applied to the liquid crystal layer is 0 V is higher than the relative transmittance when a voltage to be applied to the liquid crystal layer is the minimum drive voltage.

4. The liquid crystal apparatus according to claim 1, wherein the first oriented film and the second oriented film respectively include columnar structure bodies including columnar bodies inclined with respect to a normal line direction to the first substrate.

5. An electronic apparatus comprising the liquid crystal apparatus according to claim 1.

6. A method for driving the liquid crystal apparatus according to claim 1, the liquid crystal layer being a normally black mode, the method comprising:
   setting a minimum drive voltage representing a voltage difference between a first electrode and the second electrode corresponding to a minimum tone level, to a voltage higher than 0 V but lower than a threshold voltage at which, in a relative transmittance-voltage characteristic indicative of a relationship between a voltage to be applied to the liquid crystal layer and relative transmittance, the relative transmittance is 10%.

7. The method for driving the liquid crystal apparatus according to claim 6, wherein the relative transmittance when a voltage to be applied to the liquid crystal layer is 0 V is higher than the relative transmittance when a voltage to be applied to the liquid crystal layer is the minimum drive voltage.

8. The liquid crystal apparatus according to claim 1, wherein the optical compensation layer compensates elliptically polarized light components while the long axis direction of the liquid crystal molecules forms an angle of 90° with respect to the first inclined surface.

* * * * *